United States Patent Office 3,840,565
Patented Oct. 8, 1974

3,840,565
2-[3-(2 - TETRAHYDROFURYL)-PROPIONYL] - 1,3-CYCLOPENTANEDIONE AND PRODUCTION OF THIS NEW PHYSIOLOGICALLY ACTIVE COMPOUND
Masaji Ohno, Masaru Okamoto, Norio Kawabe, Mutsuo Kataoka, and Kazuo Hosoi, Kamakura, Japan, assignors to Zaidan Hojin Biseibutsu Kagaku Kenkyu Kai, Tokyo, Japan
No Drawing. Filed Aug. 3, 1971, Ser. No. 168,750
Claims priority, application Japan, Sept. 1, 1970, 45/75,997
Int. Cl. C07d 5/04
U.S. Cl. 260—347.8                         7 Claims

ABSTRACT OF THE DISCLOSURE

2-[3-(2 - tetrahydrofuryl)-propionyl]-1,3-cyclopentanedione which is new and useful as hypotensive agent may be produced by hydrogenating 2-[3-(2-furyl)-acryloyl]-1,3-cyclopentanedione in the presence of a base such as sodium hydroxide and in the presence of a catalyst comprising platinum, palladium or rhodium.

This invention relates to a new and useful compound 2-[3-(2-tetrahydrofuryl)-propionyl] - 1,3 - cyclopentanedione which has a physiological activity and shows a remarkable effect as a blood pressure reducing agent, namely as a hypotensive agent. This invention further relates to a process for the production of this new physiologically active compound by a hydrogenation.

The novel compound according to the present invention is 2-[3-(2-tetrahydrofuryl)-propionyl]-1,3-cyclopentanedione as represented by the formula:

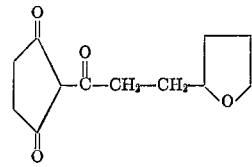

[I]

we have succeeded in synthesizing this new compound (I) by a hydrogenation of 2-[3-(2-furyl)acryloyl]-1,3-cyclopentanedione, and we have now found that this new compound (I) has a low toxicity a useful activity of reducing the blood pressure in high blood pressure rats, and high biochemical activity of inhibiting the action of tyrosine hydroxylase and inhibiting biosynthesis of epinephrin and that ths new compound (I) can effectively be used for the treatment of hypertensive diseases of humans.

An object of this invention is to provide 2-[3-(2-tetrahydrofuryl)-propionyl]-1,3-cyclopentanedione as this new and useful medicinal compound. A further object of this invention is to provide an efficient and commercially feasible process for the synthetic production of this new compound starting from 2-[3-(2-furyl)-acryloyl]-1,3-cyclopentanedione which may readily be prepared.

According to a first aspect of the present invention, therefore, we provide as a new and useful compound 2-[3-(2 - tetrahydrofuryl) - propionyl] - 1,3 - cyclopentanedione. Physical and physiological properties of this new compound [I] will be described later.

According to a second general aspect of the present invention, we provide a process for the production of 2-[3-(2 - tetrahydrofuryl) - propionyl] - 1,3 - cyclopentanedione and a salt thereof which comprises reducing or hydrogenating selectively 2-[3-(2-furyl)-acryloyl]-1,3-cyclopentanedione with hydrogen in the presence of a base and of a hydrogenation catalyst comprising one of platinum, palladium and rhodium.

According to an embodiment of the second aspect of the present invention, there is provided a process for the production of 2-[3-(2-tetrahydrofuryl)-propionyl]-1,3-cyclopentanedione and a salt thereof, which comprises reducing or hydrogenating 2-[3-(2-furyl)-acryloyl]-1,3-cyclopentanedione with hydrogen in the presence of a base and of a hydrogenation catalyst comprising platinum.

According to a preferred embodiment of the second aspect of the present invention, there is provided a process for the selective production of 2-[3-(2-tetrahydrofuryl)-propionyl]-1,3-cyclopentanedione and a salt thereof which comprises reducing or hydrogenating selectively 2-[3-(2 - furyl)-acryloyl]-1,3-cyclopentanedione with hydrogen in the presence of a base and of a hydrogenation catalyst comprising palladium or rhodium.

2-[3-(2-furyl)-acryloyl]-1,3-cyclopentanedione (hereinafter called merely the β-furyl acryloyl derivative) which is used as the starting material for the process of the present invention usually exists in a form of an equilibrium mixture comprising their tantomers of the formulae as shown below.

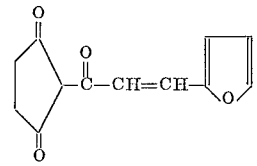

(II)

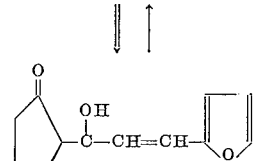

(III)

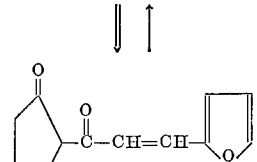

(IV)

Hithertofore, it is known that when β-furyl propionyl derivatives which have been known up to date, such as β-furyl acrylic acid are catalytically reduced with hydrogen, the hydrogenation can proceed non-selectively so that the furan ring has been cleaved through the hydrogenolysis in some of the hydrogenation products while the furan ring is merely hydrogenated into the tetrahydrofuran form in another product (see Org. Syn. Vol. II, p. 745).

We have now found that when a palladium or rhodium catalyst is used in the process of the present invention, only the furyl-acryloyl moiety in the starting β-furyl acryloyl derivative which is normally comprised of the above-mentioned mixed tantomers [II], [III] and [IV] can be reduced selectively with leaving the enol-double bond unaffected in the molecule of the hydrogenation product, so that the desired 2 - [3 - (2-tetrahydrofuryl)-propionyl]-1,3-cyclopentanedione can be yielded substantially quantitatively and hence preferentially. When a platinum catalyst is used in the process of the present invention, however, the hydrogenation of the furyl-acryloyl moiety cannot proceed so much preferentially as with the palladium and rhodium catalysts, and there may be involved the formation of as a by-product some quantity of 2 - (4 - hydroxyheptanoyl) - 1,3 - cyclopentanedione as shown by the following formula:

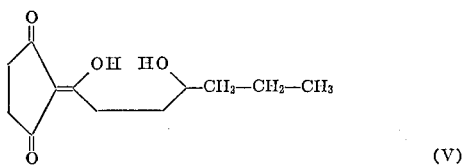

(V)

The hydrogenation catalyst used for the present process may comprise any one of palladium, rhodium and platinum. However, the palladium and rhodium catalysts are preferred because of their higher selectivity. The catalyst may comprise the noble metal in the form of the metal itself, oxide or chloride, either alone or supported by a carrier such as carbon, alumina, silica and the like. As the supported catalyst, palladium on carbon, palladium on alumina, palladium on silica gel, rhodium oxide, rhodium on alumina are preferred. The amount of the catalyst charged depends on the reaction temperature and duration employed, but the noble metal component of the catalyst normally may be present in an amount of not more than ½ parts by weight and desirably in range of ⅕ to ¹⁄₁₀₀₀ parts by weight per part of the starting β-furyl acryloyl derivative.

As clear from the above, the process of the present invention requires the presence of a base. As the base there may be used an inorganic base of a metal of Group I and Group II of the Periodic Table, such as hydroxides and carbonates. For example, sodium hydroxide, potassium hydroxide, lithium hydroxide, calcium hydroxide, barium hydroxide, sodium carbonate, potassium carbonate and the like are suitable. Moreover, sodium hydride and lithium hydride as well as sodium methylate, sodium ethylate, potassium methylate and potassium butylate may also be suitable as these will provide an inorganic base in the reaction medium in the presence of an amount of water. In order to dissolve the base in the reaction medium which may be an organic solvent for the starting material and inert to the catalytic hydrogenation, an amount of water may be added to the reaction medium, if desired. It is desirable that the base is present in a proportion of not less than 1 mol per mol of the starting β-furyl acryloyl derivative and particularly in an amount enough to keep the reaction mixture at a pH of not less than 6.0 throughout the reaction. It is especially preferable to provide the presence of 1-2 mols of the base per mol of the starting β-furyl acryloyl derivative. As mentioned above, the presence of a base is required essentially for the process of the present invention in order to yield the desired product [I], since the absence of the base can cause an exhaustive reduction of the starting β-furyl acryloyl derivative into 2-[3-(2-tetrahydrofuryl)-propyl]-1,3-cyclopentadione which has no biological activity.

The process of the present invention may be carried out in a solvent as the reaction medium which has conventionally been used in the usual catalytic hydrogenation, as long as the solvent dissolves or disperses the starting material and does not adversely affect the catalytic hydrogenation of the present process. For example, methanol, ethanol, tetrahydrofuran, dioxane, acetic acid and the like are suitable for the solvent or the reaction medium.

In the process of the present invention, the hydrogenation reaction may be effected with hydrogen under a pressure of 1-100 kg./cm.² and at a temperature of 0-80° C. With the palladium and rhodium catalyst, a reaction temperature of 0-60° C. is preferable. With the platinum catalyst, a reaction temperature of 0-60° C. is also preferable. At a reaction temperature of higher than 80° C., the yield of the desired product can undesirably deteriorate due to increased instability of the final product.

When the hydrogenation reaction has been effected, the catalyst is removed from the reaction mixture, for example, by filtration and the solvent is then distilled off to give a salt of the desired product 2-[3-(2-tetrahydrofuryl) - propionyl] - 1,3 - cyclopentanedione with the base employed, occasionally together with by-products. When the palladium or rhodium catalyst has been employed in the present process, the starting β-furyl acryloyl derivative can substantially in quantitative yield be converted into the salt of the desired product, though there may sometimes be yielded an intermediate product 2-[3-(2-furyl) - propionyl] - 1,3 - cyclopentanedione. When the platinum catalyst has been used in the present process, the desired compound is usually accompanied by the by-product 2-(4 - hydroxyheptanoyl)-1,3-cyclopentanedione and its salt.

The starting material 2-[3-(2-furyl)-acryloyl]-1,3-cyclopentanedione as well as the hydrogenation product 2-[3 - (2-tetrahydrofuryl)-propionyl]-1,3-cyclopentandione are of acidic nature. Therefore they form a corresponding salt with the base present together in the present process, respectively. Consequently, the reaction mixture from the present hydrogenation process usually contains the desired product 2-[3-(2-tetrahydrofuryl)-propionyl]-1,3-cyclopentanedione in the form of its salt with the base employed. If desired, the salt may be converted into the free form by treating with an aqueous diluted mineral acid such as hydrochloric acid, sulfuric acid, phosphoric acid etc., or acetic acid to liberate 2-[3-(2-tetrahydrofuryl)-propionyl]-1,3-cyclopentanedione in the free form. This acid-treatment of the salt may be effected in situ in the reaction mixture before the isolation of said salt, or alternatively the salt may first be isolated from the reaction mixture and then converted to the free form by treating with an aqueous diluted mineral acid. It is easy for the skilled in the art to purify a crude product containing the salt form or the free form of 2-[3-(2-tetrahydrofuryl) - propionyl]-1,3-cyclopentanedione, for example, by silica gel chromatography or alumina gel chromatography, so that 2-[3-(2-tetrahydrofuryl)-propionyl]-1,3-cyclopentanedione or its salt may be recovered as a pure product.

The 2 - [3-(2-furyl)-acryloyl]-1,3-cyclopentanedione [II] which is used as the starting material for the present process may readily be prepared, for example, by reacting 2-acetyl-1,3-cyclopentanedione with furfural according to a known aldol condensation reaction as shown by the following equation:

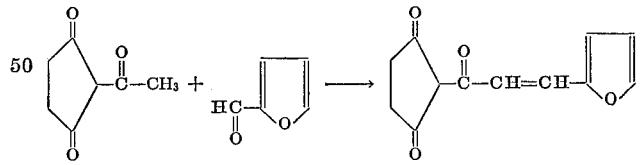

For the preparation of the starting material [II], the above aldol condensation reaction may be carried out by dissolving 2-acetyl-1,3-cyclopentanedione in its one-fold to ten-fold amount of furfural and treating the resultant solution with a base. The base to be used for this aldol condensation may be any known one insofar as it can cause the aldol condensation to take place, though a secondary amine such as morpholine, piperidine and pyrrolidine are especially preferred for this purpose.

If desired, the above aldol condensation may be effected in a solution of the reactants in an inert organic solvent such as methylene chloride, chloroform, benzene and ethyl ether. The aldol condensation may preferably be carried out at a reaction temperature ranging from about 20° C. to about 100° C., and thus 2-[3-(2-furyl)-acryloyl]-1,3-cyclopentanedione may be obtained as yellow colored crystals in yield of 85–95%. In case the aldol condensation is carried out at a temperature of higher than 100° C., the product can be decomposed in tars, decreasing the yield of the product.

Physical and physiological properties of 2-[3-(2-tetrahydrofuryl)-propionyl]-1,3-cyclopentanedione are now described. This new compound [I] is a colorless oil boiling at 102–105° C. under 0.08 mm. Hg and is partially soluble in water, easily soluble in methanol, ethanol, tetrahydrofuran and dioxane. It is of acidic nature and hence it forms a salt with an alkail metal hydroxide and potassium hydroxide. The compound [I] has a low toxicity and shows a $LD_{50}$ value of 850 mg./kg. when administered orally or intravenously to mice in the form of its solution in water .

Hydroxylation of tyrosine is the rate-limiting step of norepinephrine biosynthesis. Therefore, inhibition of tyrosine hydroxylase results in inhibition of norepinephrin synthesis *in vivo* which, in turn, brings about a lowering of the blood pressure. Thus, inhibition of tyrosine hydroxylase gives one of measures of the activity of lowering the blood pressure. Daily injection or daily oral administration of 12.5 mg./kg./day of the compound [I] (racemic) to rats lowered blood pressure by 20–25%. The hypotensive effect can be seen more markedly, when it is given to genetically hypertensive rats which was developed by Prof. Okamoto, Medical School, University of Kyoto.

Effect of the compound [I] on tyrosin hydroxylase was tested by the following method: a reaction mixture contained 0.1 $\mu$mole of L-tyrosine-$^{14}$C ($1.1 \times 10^5$ c.p.m.), 1 $\mu$mole of 2-amino-4-hydroxy-6,7-dimethyltetrahydropteridine, 0.1 cc. of tyrosine hydroxylase solution (1 mg. as protein/cc.), 200 $\mu$mole of acetate buffer of pH 6.0, 100 $\mu$mole of mercaptoethanol, 100 mcg, and 180 mcg. of the compound [I] in 1.0 cc.; after 15 minutes at 30° C., 3,4-dihydroxyphenylalanine-$^{14}$C was separated from the reaction mixture by alumina chromatography and determined by the radioactivity. In this test, the following inhibition percent was observed at the following concentrations of the compound [I]: 31% at 100 mcg./cc. and 50% at 180 mcg./cc. For comparision, oudenone which is the levoratory form of 2-(4,5-dihydro-5-propyl-2(3H)-furylidene)-1,3-cyclopentanedione (see Belgian Pat. No. 720,023 applied on Dec. 8, 1971) was tested in the same procedure, and it was found that oudenone exhibited inhibition percent of tyrosin hydroxylase which amounted to 74.1% at 100 mcg./cc. and 57.6% at 50 mcg./cc.

The compound [I] of the present invention may be administered orally or parenterally. Thus, the compound [I] may be formulated in a conventional manner into a solution, dispersion, dispersible powder, compressed tablet, pill, pellet, capsule and the like with aid of known pharmaceutical carrier. For oral administration, the compound [I] may be made up into tablets, pills, granules and dispersible powder by mixing with an inert diluent such as calcium carbonate, potato starch, alginic acid or lactose and an additional material, for example, lubricating agent such as magnesium stearate and then, if necessary, compressing the mixture. For parenteral administration, the compound [I] may be formulated into a sterile injectable aqueous or non-aqueous solution, dispersion or emulsion with aid of liquid media such as propylene glycol, polyethylene glycol, vegetable oils. The pharmaceutical formulations comprising the compound [I] may also contain adjuvants such as wetting agent, dispersing agents and emulsifying agents, if necessary. The content of the compound [I] in such pharmaceutical formulations may be varied so that a suitable dosage is obtained upon an administration thereof.

The invention is now illustrated by the following examples but to which the invention is not limited.

EXAMPLE 1

This example explains the preparation of 2-[3-(2-furyl)-acryloyl]-1,3-cyclopentanedione which is used as the starting material for the present process.

In a 50 cc. flask was charged 10 g. of furfural, to which 27.2 g. of 2-acetyl-1,3-cyclopentanedione was added and to the resultant mixture was gradually added 0.5 cc. of piperidine. When the reaction mixture was heated over steam bath for 5 minutes and allowed to stand at room temperature for 1 hour, depositing yellow crystals. When the crystals were filtered, 1.3 g. of the crystals was collected. Further 0.5 cc. of piperidine was added to the filtrate and the resultant mixture was heated over a steam bath for 5 minutes and cooled, to give 0.65 g. of the crystals.

When these two crops of the crystals were combined and recrystallized from a mixed solvent of methanol and methylene ch'oride, 2-[3-(2-furyl)-acryloyl]-1,3-cyclopentanedione was yielded in the form of yellow colored crystals of melting point of 180–181° C. Physical properties and elementary analysis of this crystalline product were determined and shown below:

IR: 3420, 1635, 1610, 1580, 1530, 1020 cm.$^{-1}$.

UV: $\lambda_{max}$ 219 m. (12,700). 370 m. (12,250), 400 m. (17,200).

Elementary anaylsis.—Found (percent): C, 66.14; H, 4.60. Calculated $C_{12}H_{10}O_4$ (percent): C, 66.05; H, 4.62.

Molecular weight.—Found: 224 ($CHCl_3$). Calculated: 213.2.

The above value identified the product as 2-[3-(2-furyl) acryloyl]-1,3-cyclopentanedione.

EXAMPLE 2

In a 100 cc. flask suitable for hydrogenation was charged 1.0 g. (4.59 mmol) of 2-[3-(2-furyl)-acryloyl]-1,3-cyclopentanedione, to which 5.5 cc. of IN aqueous solution of sodium hydroxide (0.22 g: 552 mmol), 10 cc. of water and 50 cc. of ethanol were added. The hydrogenation was effected by passing hydrogen through the content of the flask in the presence of 0.20 g. of 5% palladium-charcoal under atmospheric pressure, absorbing 336 cc. of hydrogen in 3 hours. After the hydrogenation, the catalyst was removed by filtration and the ethanol was distilled off. The residue was treated with 2N hydrochloric acid and then extracted with a mixed solvent of methylene chloride and ethyl ether. After drying the organic layer, the solvents was distilled off to yield 0.987 g. of an oily material. This product was then subjected to silica gel chromatography, affording 0.156 g. (0.7 mmol, 15.5% yield) of a colorless crystalline compound, 2-[3-(2-furyl)-propionyl]-1,3-cyclopentanedione (the dihydro derivative) from the first running of eluates as well as 0.178 g. (3.2 mmol. 70% yield) of an oily product, 2-[3-(2-tetrahydrofuryl)-propionyl] - 1,3-cyclopentanedione (the hexahydroderivative) from the subsequent part of eluates.

The above-mentioned dihydro derivative was recrystallized from a mixed solvent of petroleum ether and ethyl ether, showing m.p. 61–62° C.

| | C (percent) | H (percent) | M.W. |
|---|---|---|---|
| $C_{12}H_{12}O_4$ | | | |
| Found | 65.23 | 5.59 | 224 |
| Calc | 65.44 | 5.49 | 220.22 |

The above-mentioned hexahydro derivative was distilled under a reduced pressure, showing b.p. 102–105° C./0.08 mm. Hg.

| | C (percent) | H (percent) | M.W. |
|---|---|---|---|
| $C_{12}H_{16}O_4$ | | | |
| Found | 64.24 | 7.20 | 227 |
| Calc | 64.27 | 7.19 | 224.25 |

EXAMPLE 3

In a 50 cc. flask suitable for hydrogenation was charged 0.20 g. of 2-[3-(2-furyl)acryloyl]-1,3-cyclopentanedione, to which 0.044 g. of sodium hydroxide, 1.5 cc. of water and 10 cc. of ethanol were then added. The hydrogenation was effected by passing hydrogen through the content of the flask in the presence of 0.05 g. of rhodium oxide under atmospheric pressure, absorbing 61 cc. of hydrogen in 45 hours. After the hydrogenation, the catalyst was removed by filtration and the solvent was distilled off. The residue was treated with diluted hydrochloric acid and extracted with a mixed solvent of methylene chloride and ethyl ether. After drying the organic layer, removal of the solvents afforded 0.18 g. of a yellowish oily product.

It was subjected to silica gel chromatography to give the hexahydro derivative in 65% yield and the dihydro derivative in 10% yield.

EXAMPLE 4

In a 100 cc. flask suitable for hydrogenation were charged 0.211 g. (0.00528 mol) of sodium hydroxide, 15 cc. of water and 50 cc. of ethanol, to which 1.0 g. (0.00459 mol of 2-[3-(2-furyl)-acryloyl] - 1,3-cyclopentanedione was then added. It was hydrogenated by passing hydrogen through the content of the flask in the presence of 0.3 g. of platinum oxide with vigorous stirring under atmospheric pressure. The hydrogenation continued for 22 hours, absorbing about 450 cc. of hydrogen.

After the hydrogenation was completed, the entire reaction mixture was filtered and the solvent was completely removed to give a white solid. This solid was identified as a mixture of a sodium salt of 2-[3-(2-tetrahydrofuryl)-propionyl]-1,3-cyclopentanedione and a sodium salt of 2-(4,5-dihydro-5-propyl-2(3H)-furylidene)-1,3-cyclopentanedione in view of its UV, NMR and IR spectra as well as its chemica behaviours.

The white solid was dissolved in water, and to the resultant aqueous solution was added a proper amount of a mixed solvent of ethyl ether and methylene chloride (1:1). The resultant mixture was treated with about 2N hydrochloric acid and adjusted to pH 1–2, and the organic layer of said mixture was well washed with water and thereafter dried over anhydrous sodium sulfate.

The ether and the methylene chloride were distilled off, affording 954 mg. of yellow oily substance. This oily substance was subjected to silica gel chromatography to give 280 mg. of the tetrahydro derivative and 524 mg. of 2-(4,5 - dihydro - 5 - propyl - 2(3H)-furylidene)-1,3-cyclopentanedione as crystals.

The by-product 2-(4,5-dihydro-5-propyl-2(3H)-furylidene)-1,3-cyclopentanedione had a melting point of 83–84° C. The tetrahydro derivative obtained was a liquid having a boiling point of 102–105° C./0.08 mm. Hg.

What we claim is:

1. 2 - [3 - (2 - tetrahydrofuryl) - propionyl] - 1,3-cyclopentanedione.
2. A process for the production of 2-[3-(2-tetrahydrofuryl)-propionyl]-1,3-cyclopentanedione which comprises hydrogenating 2-[3-(2-furyl)-acryloyl]-1,3-cyclopentanedione with hydrogen in the presence of a base and a hydrogenation catalyst selected from the group consisting of palladium and rhodium and treating the product with an acid to liberate said 2-[3-(2-tetrahydrofuryl)-propionyl]-1,3-cyclopentanedione.
3. A process as claimed in claim 2 in which said base is selected from the group consisting of sodium hydroxide, potassium hydroxide, calcium hydroxide, barium hydroxide, sodium carbonate and potassium carbonate.
4. A proces as claimed in Claim 2 in which the hydrogenation catalyst used comprises palladium-carbon, palladium-alumina, palladium-silica gel or rhodium oxide.
5. A process as claimed in claim 2 in which the hydrogenation is carried out at a temperature of 0–80° C.
6. A process as claimed in Claim 2 in which the salt of the produced 2-[3-(2-tetrahydrofuryl)-propinoyl]-1,3-cyclopentanedione with the base employed is treated with an aqueous diluted mineral acid to liberate the free form of 2-[3-(2-tetrahydrofuryl)-propionyl]-1,3-cyclopentanedione before or after it is isolated from the reaction mixture.
7. A process as claimed in claim 2 wherein said base comprises an alkali metal or alkaline earth metal compound and is present in an amount sufficient to maintain the pH of the reaction mixture at not less than 6.0 throughout the reaction.

References Cited

Ohno et al., J. Am. Chem. Soc., March 10, 1971, vol. 93(5), pp. 1285–6.

NATALIE TROUSOF, Primary Examiner

B. DENTZ, Assistant Examiner

U.S. Cl. X.R.

424—285; 260— R, 240 J